May 2, 1961 A. S. FITZ GERALD 2,982,405
DRILL SORTER

Filed Dec. 6, 1955 4 Sheets-Sheet 1

INVENTOR.

Alan S. FitzGerald

May 2, 1961 A. S. FITZ GERALD 2,982,405
DRILL SORTER
Filed Dec. 6, 1955 4 Sheets-Sheet 2
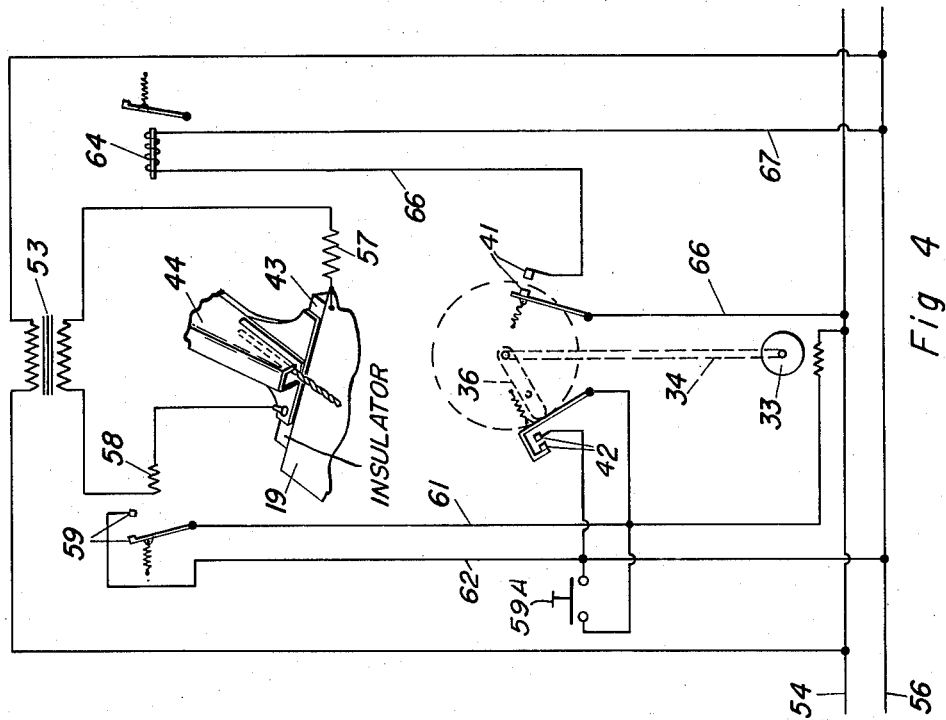
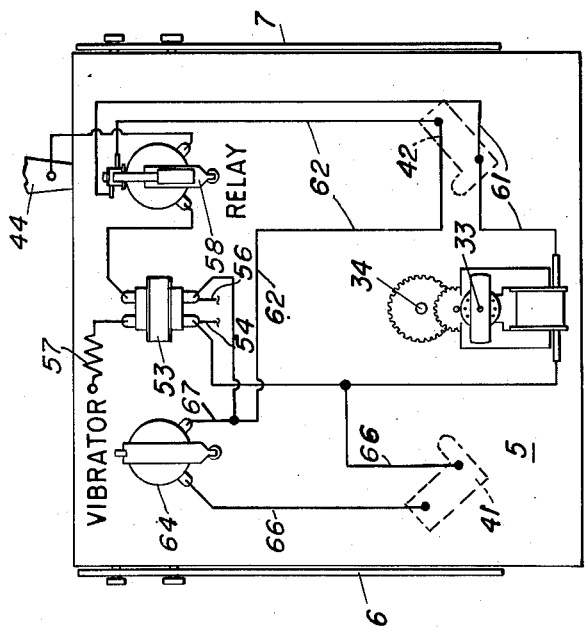
INVENTOR.
Alan S. FitzGerald May 2, 1961  A. S. FITZ GERALD  2,982,405
DRILL SORTER
Filed Dec. 6, 1955  4 Sheets-Sheet 3
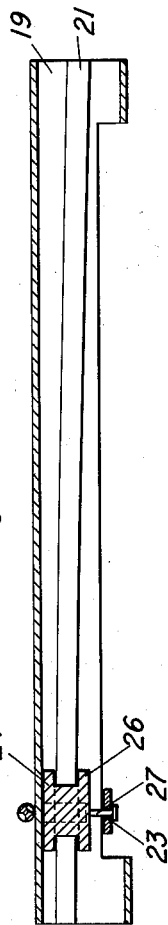
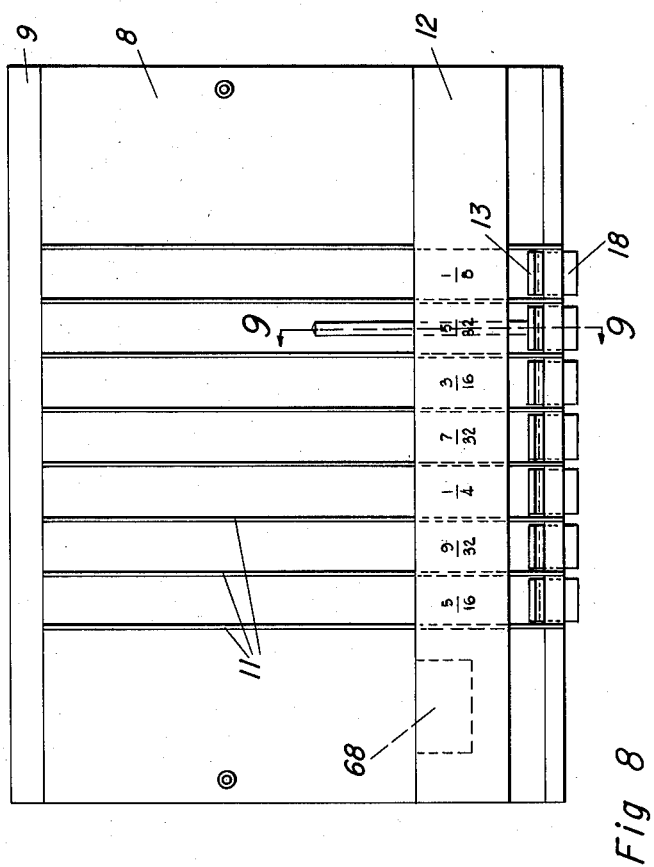
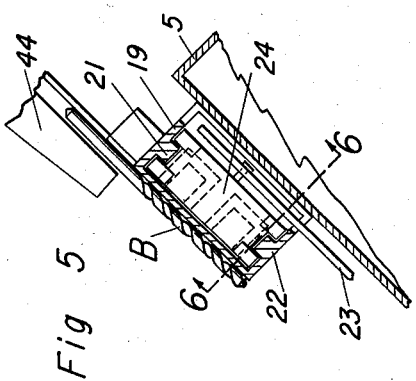
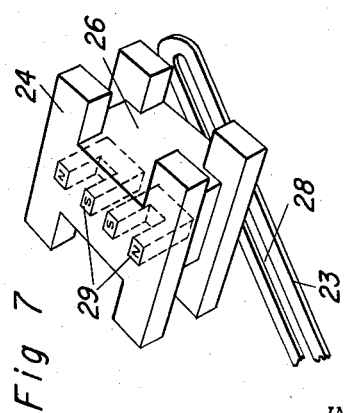
INVENTOR.
Alan S. FitzGerald May 2, 1961 A. S. FITZ GERALD 2,982,405
DRILL SORTER
Filed Dec. 6, 1955 4 Sheets-Sheet 4
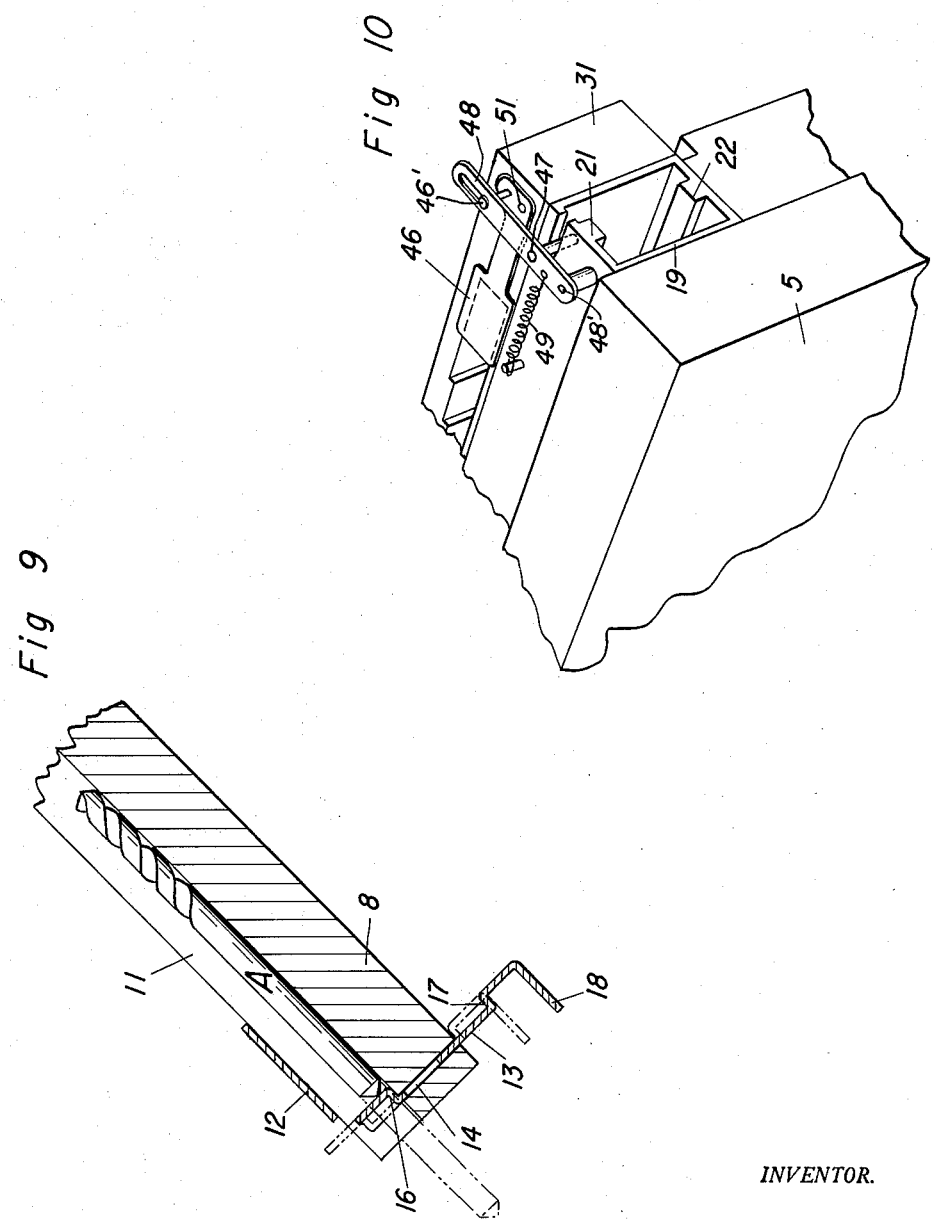
INVENTOR.
Alan S. Fitz Gerald

United States Patent Office
2,982,405
Patented May 2, 1961

2,982,405

DRILL SORTER

Alan S. FitzGerald, 333 Corte Madera Ave., Mill Valley, Calif.

Filed Dec. 6, 1955, Ser. No. 551,393

8 Claims. (Cl. 209—90)

This invention relates to improvements in drill sorters.

The principal object of my invention is to provide a device which will automatically sort drills of various sizes and then deposit them in a conveniently positioned storage rack from which they may be later removed for use.

A further object is to produce a device of this character which receives the drills and delivers them to the gauge irrespective of which end of the drill is presented to the device.

A further object is to produce a device of this character which is economical to manufacture, easy to use and one which has a minimum number of working parts.

A further object is to produce a device which may also be used for sorting round elongated magnetically attractive objects other than drills.

Other objects and advantages will be apparent during the course of the following description.

In the accompanying drawings forming a part of this specification and in which like numbers are employed to designate like parts throughout the same, Fig. 1 is a perspective view of my drill sorter as viewed from the front;

Fig. 3 is a view of the under side of base member 5 of the same drill sorter, showing the arrangement of components and wiring;

Fig. 4 is a diagrammatic presentation of the electrical wiring system;

Fig. 5 is a cross sectional view of the carriage cage taken on the line 5—5 of Fig. 1 and showing a drill magnetically held thereon;

Fig. 6 is a longitudinal cross sectional view of the slide cage taken on the line 6—6 of Fig. 5;

Fig. 7 is a perspective view of the magnetic carrier;

Fig. 8 is a plan view of the drill storage rack;

Fig. 9 is a fragmentary cross sectional view taken on the line 9—9 of Fig. 8; and Fig. 10 is a fragmentary perspective view, some parts being displaced and distorted somewhat to show the operating relationships more clearly, illustrating the operating mechanism for the drill stop gate.

Figure 2:
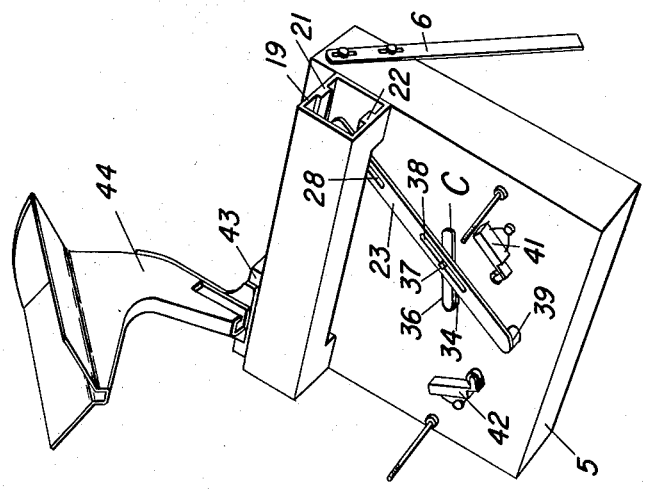
Fig. 2 is a view of the same drill sorter with certain parts removed.

Machine drills consist of lengths of material having a shank portion and a drill portion. The drill portion has flutes formed in its sides and of twisted configurations. These drills are all measured as to their cross-sectional diameter, some being rated as to number sizes and others rated as to fractional sizes. Each size or number varies slightly between a given drill and the next in order. Therefore, it is almost impossible for a person to tell by sight the size of the drill. All drills are stamped on the shank portion with its number or size. However, when the drills are used, these indicia become worn so that it becomes increasingly difficult to determine the diameter of a given drill. It is therefore often necessary to measure the drill with a micrometer or drill gauge in order to determine its exact size. This is a time-consuming operation when a large number of drills are constantly being used, as for instance in a factory where the drills are issued from the tool room and returned thereto for storage and sharpening, etc. It thus becomes vital that some means be found for reducing the labor factor in the sorting of the drills.

Consequently, applicant has devised a drill sorter wherein the operator merely drops the drills, one at a time, into a hopper and thereafter the drill will be automatically sized and returned to its proper storage receptacle with the assurance that when the user wishes to use a certain size drill, he merely has to lift the same from its receptacle without the necessity of gauging the drill to be sure it is the correct size.

In the accompanying drawings, wherein for the purpose of illustration is shown a preferred embodiment of my invention, the numeral 5 designates a substantially rectangular hollow base member which is normally held in inclined position by legs 6 and 7. This base serves to house the motor and electrical circuit as will be hereinafter described.

Mounted on the base 5 is a drill storage rack 8 which is cut away as shown at 9 to form a ledge and is provided with a plurality of upstanding partitions 11 for the reception of the drills therebetween as will be later seen.

Supported above the partitions is a strip 12 on which are placed indicia directly above each one of the spaces between the partitions and indicating the sizes of the drill to be deposited therebeneath. See Fig. 8.

Referring to Fig. 9 it will be noted that I provide a slider gate 13 having an opening 14 therein and offset portions 16 and 17. This gate has a finger piece 18 through the medium of which the same may be slid from its full-line position to the dotted line position which movement will move the opening 14 into alignment with the drill shown at A, thus permitting it to slide outwardly into the hand of the user, ready for use.

Also secured to the base 5 is a hollow carriage cage 19, made of non-magnetic material. This cage is rectangular in cross section and has formed therein opposed tracks 21 and 22. By viewing Fig. 6 it will be noted that these tracks slant downwardly from one end to the opposite end, the purpose of which will be later seen.

By viewing Figs. 2 and 6, it will also be noted that the under portion of this cage is cut away so as to admit the free end of the lever 23 to pass therebeneath and connect to a carriage 24 adapted to slide back and forth on the tracks 21 and 22. This carriage 24 has two H-shaped pieces (see Fig. 7) which are held in spaced relation by a block 26 having a downwardly extending pin 27 which engages the slot 28 in the lever 23. This carriage has imbedded therein a pair of U-shaped magnets as shown at 29 which magnets have their like poles adjacent each other and with their pole ends facing in the same direction, namely, toward the underside of the top of the carriage cage, whereby a drill, as shown at B in Fig. 5, will be magnetically held against the upper surface of the cage from the time it is received on the cage until it is discharged into one of the spaces between the partitions 11 in the storage rack.

Mounted on the cage is a gauge plate 31 (see Fig. 1) which has its undersurface formed with a tapered recess so as to provide a series of steps 32 to provide a decrease in space between the step and the top surface of the cage equal to the decrease in diameter of each drill to be sorted.

In order to move the carriage 24 back and forth I provide a motor 33 (see Fig. 3) which is mounted in the base 5, which motor in turn, through the medium of gears, rotates the shaft 34 and consequently the arm 36. This arm has an upstanding pin 37 riding in a slot 38 in the lever 23, which lever is pivoted as at 39 to the base 5.

By viewing Fig. 2 it will be noted that I have mounted two switch members as shown at 41 and 42, which are adapted to be contacted by the end C of the arm 36 as it moves in its circular path about the axis of the shaft 34. The purpose of these switches will be later seen.

Secured to the cage 19 is an insulating block 43 to which is secured the lower end of a hopper 44 having a narrow throat pointing downwardly as best shown in Fig. 4. The top of the hopper has flaring sides, whereby a drill dropped therein will naturally roll down and into the neck of the hopper without undue care on the part of the user in placing the drill into the hopper.

By viewing Figs. 2 and 10 it will be noted that I have provided a gate 46 made of insulating material which is pivoted to the gauge plate 31 and is directly in alignment with the discharge end of the hopper. The purpose of this gate is to prevent drills dropping into the gauge plate portal prior to the return of the carriage to its initial or starting position.

When the carriage 24 returns to its initial position, it strikes a pin 47 which extends into the space alongside track 21. This pivots the lever 48 on pin 48' against the tension of a spring 49 so as to move pin 46' to the right and pivot the gate on its pivot 51 out of the path of the drill issuing from the hopper to the gauge portal.

Assuming now that it is desired to sort a number of drills, the first drill is dropped into the hopper 44 and moves downwardly therethrough until it assumes the position shown in Fig. 5, that is, the end of the drill, either the twist portion or the shank portion, will be resting upon the cage directly over the magnets in the carriage 24. As the drill slides from the hopper into this position, the magnets will resist any further movement of the drill, thus holding it in the portal ready to be gauged.

Figure 1:
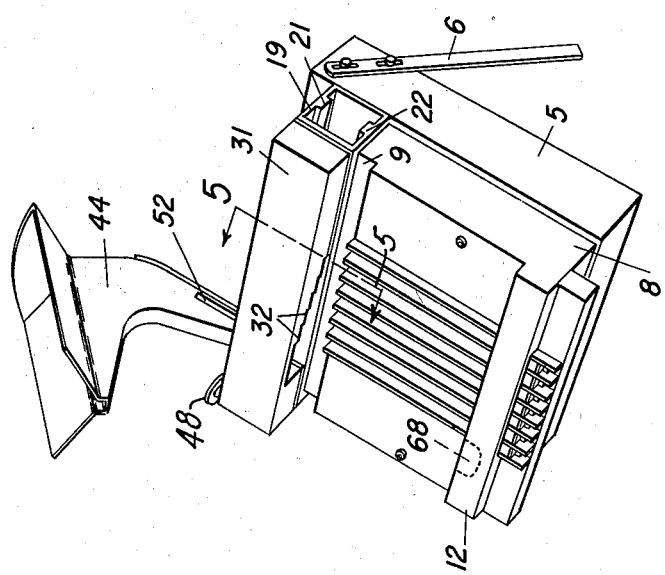

Referring now to Fig. 1 it will be noted that I have provide a slot 52 in the side of the hopper so that if there are particularly long drills to be sorted, the upper end of such a drill will pass out of the hopper through the slot as the drill is moved from the portal portion of the gauge to the gauging portion.

By referring now to Fig. 4, it will be noted that I have provided a transformer 53, the primary side of which is connected to the source of electrical energy, here shown as wires 54 and 56. The secondary side of the transformer is connected through a resistance 57 to the cage 19, while the opposite side of the transformer is connected through a solenoid of a relay 58 to the hopper 44, which hopper is mounted on the insulating block 43. Consequently, as the drill passes from the hopper to its position on the cage, a circuit will be immediately completed with the following results:

The relay 58 will close contacts 59 of the relay, thus completing a circuit from the wire 56 through the wire 61 to the motor 33 and then back to the other side of the line 54. As soon as this occurs, the motor will rotate the shaft 34 and consequently the arm 36 which will immediately permit the closing of the contacts of the switch 42, which will complete the circuit between the wires 54 and 56, thus holding the motor circuit closed.

At the same time, rotation of the arm 36 will have caused the lever 23 to start to move from its position of rest at the left of the sorter toward the right. This will cause the carriage 24 and its magnets to roll the drill along the top of the cage and out of engagement with the hopper 44. As soon as this occurs, the relay 58 will let go, breaking the contacts 59.

Continued rotation of the arm 36 will cause the carriage and lever 23 to move to the position shown in Fig. 2. At the same time, the drill will have arrived at one of the steps in the gauge, which it cannot pass, the distance between the step and the top of the cage being equal to the diameter of the drill.

At this point the drill will be stopped in its movement but the carriage will travel on, thus moving the magnets away from beneath the drill and consequently the drill will fall by gravity into the storage rack.

During the travel of the carriage from left to right, the magnets will be moving away from the top surface of the cage, the purpose of which is to decrease the magnetic pull when small drills are being sorted. In other words, the greatest magnetic pull is necessary just after the drill drops from the hopper into the portal of the gauge as it overcomes gravity and also is able to stop large, heavy drills.

However, when the small drills are being sorted, they do not require as much magnetism and as they reach the end of their travel over the gauge, the magnets are withdrawn therefrom so that they will more quickly be released.

As the arm 36 continues to travel around, it will engage the switch 41, thus completing a circuit to the vibrator 64 through the wires 66 and 67 to the opposite side of the line. The purpose of this vibrator is to cause any drills which may be stuck in the gauge due to small chips, dirt, etc., to be dislodged and dropped into their individual racks.

However, should the vibration be insufficient to loosen the drill and cause it to fall into the storage rack, then the carrier, on its backward movement, will again pick up the drill and carry it back to the starting position where it will again complete the circuit between the cage and the hopper and the whole sequence of events will again take place. This sequence will be repeated time after time until the chip or whatever is interfering with the dropping of the drill will have been removed.

As soon as the arm 36 returns so that it is in the position shown in Fig. 4 the switch 42 will open and the cycle of operations has been completed. It will be obvious that should a person drop a drill into the hopper while the carrier is moving toward the right or has not returned to its starting position, then the gate 46 will prevent the oncoming drill from moving into the portal of the gauge and consequently the circuit between the hopper and cage cannot be completed. Should a drill be in the hopper just previous to the return of the carriage, then the opening of the gate just before the carriage comes to rest will allow the drill therein to drop through and come to rest in a pocket 68 formed in the top of the storage rack where it can be quickly picked up and again placed in the hopper.

If desired the drill sorter may be started manually, instead of automatically, by means of the momentary-contact switch or push-button shown at 59A, in Fig. 4, the contacts of which are connected in parallel with 59, and thus, in like manner, initiate the operating cycle by bridging the contacts of the switch 42.

It will thus be seen that I have provided a drill sorter which may be used for drills or other metal objects having a given diameter and one which will perform all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. Apparatus for sorting drills by their diameters, comprising a first member having a flat, sloping upper surface, an elongated gauging member overlying said first member and having a substantially horizontal lengthwise dimension, said gauging member having an under surface containing a tapered lengthwise recess extending the full width of the gauging member defining a generally wedge-shaped opening between said gauging member and said flat sloping surface, hopper-and-guide means for introducing drills to be sorted, one at a time, endwise, down said sloping surface into the lower end of said wedge-shaped opening, means for causing the so-introduced drill to roll substantially horizontally along said flat surface until its motion is stopped by contact with said under surface of the gauging member, means for releasing the so-stopped drill to move endwise downward out of said wedge-shaped opening, and a drill rack disposed below said wedge-shaped opening for receiving drills therefrom, whereby drills are sorted to various positions within said rack in accordance with their diameters.

2. Apparatus as in claim 1, said drill rack comprising a plate having a sloping upper surface substantially coplanar with the upper surface of said first member, and a plurality of parallel fins upon the upper surface of said plate, said fins extending up and down the slope of said plate and defining a plurality of side-by-side channels for receiving drills of various sizes.

3. Apparatus as in claim 2, said drill rack additionally comprising a plurality of sliding stop members, one substantially at and across the bottom of each of said channels, each of said stop members containing a hole that a drill can pass through endwise, whereby the drill in any channel can be released by sliding the stop member for that channel to bring its hole into alinement with the drill, said stop members being movable to positions wherein their holes are out of alinement with the drills in the several channels.

4. Apparatus for sorting drills by their diameters, comprising a stationary, non-magnetic member having a flat, sloping upper surface, an elongated gauging member overlying said non-magnetic member and having a substantially horizontally lengthwise dimension, said gauging member having an under surface containing a tapered lengthwise recess, extending the full width of the gauging member, defining a generally wedge-shaped opening between said gauging member and said flat, sloping surface, hopper-and-guide means for introducing drills to be sorted, one at a time, endwise, down said sloping surface into the larger end of said wedge-shaped opening, a magnet, carriage-and-track means supporting said magnet for substantially horizontal, reciprocating motion beneath said non-magnetic member, said magnet having a rest position below said larger end of the wedge-shaped opening, whereby the field of said magnet seizes the drill introduced into said opening, means for moving said magnet toward and beyond the smaller end of said wedge-shaped opening, whereby the seized drill is rolled horizontally along said sloping surface until its motion is stopped by contact with said under surface of the gauging member, the further motion of the magnet thereupon releasing the drill for endwise downward movement out of said wedge-shaped opening, and a drill rack disposed below said wedge-shaped opening for receiving the drills so released, whereby drills are sorted to various positions within said rack in accordance with their diameters.

5. Apparatus as in claim 4, said carriage-and-track means comprising a stationary pair of parallel tracks beneath said non-magnetic member, said tracks being somewhat slanted in relation to said flat upper surface, being closer to said surface near the larger end of said wedge-shaped opening and farther from said surface near the smaller end of said wedge-shaped opening, and a reciprocating carriage traveling upon said tracks, said magnet being mounted upon said carriage, whereby the magnetic force acting upon the drill decreases as the magnet and drill move toward the smaller end of the wedge-shaped opening.

6. Apparatus as in claim 4, additionally comprising a vibrator, and means operating said vibrator automatically as said magnet moves beyond the smaller end of said wedge-shaped opening, whereby release of the drill for downward movement out of the wedge-shaped opening is made more certain and reliable.

7. Apparatus as in claim 4, additionally comprising a movable gate member having a position blocking the introduction of drills into said wedge-shaped opening, means operated by said magnet being in its rest position for automatically moving said gate member out of the blocking position to permit the introduction of a drill, and spring biasing means for automatically moving said gate into said blocking position when said magnet moves out of its rest position.

8. Apparatus for sorting drills by their diameters, comprising a stationary, elongated, non-magnetic member having a substantially horizontal lengthwise dimension and a flat, upper surface sloping from one side to the other at an angle of approximately 45°, an elongated gauging member overlying said non-magnetic member and substantially parallel therewith, said gauging member having an under surface containing a tapered lengthwise recess, extending the full width of the gauging member, defining a generally wedge-shaped opening between said gauging member and said flat, sloping surface, a hopper having a lower end formed as a chute and guide for conveying drills to be sorted downward, endwise, one at a time, said chute having a lower discharge end terminating above and in alinement with the larger end of said wedge-shaped opening for introducing drills endwise down said sloping surface into said larger end of the wedge-shaped opening, means electrically insulating said chute and said non-magnetic member from each other, the spacing therebetween being smaller than a drill length, whereby each drill introduced into each said wedge-shaped opening makes a temporary electrical connection between said chute and said non-magnetic member, a stationary, substantially horizontal pair of parallel tracks beneath said non-magnetic member, said tracks being somewhat slanted in relation to said flat upper surface, being closer to said surface near the larger end of said wedge-shaped opening and further from said surface near the smaller end of said wedge-shaped opening, a reciprocating carriage traveling upon said tracks and having a rest position below said larger end of the wedge-shaped opening, a magnet mounted upon said carriage, whereby the field of said magnet seizes each drill introduced into said opening, an electric motor and circuit operable automatically to move said carriage toward and beyond the smaller end of said wedge-shaped opening and then back to said rest position upon each making of said electrical connection, whereby the seized drill is rolled horizontally along said sloping surface until its motion is stopped by contact with said under surface of the gauging member, the further motion of the carriage and magnet thereupon releasing the drill for endwise downward movement out of said wedge-shaped opening, a plate having a sloping upper surface below and substantially coplanar with the upper surface of said non-magnetic member, and a plurality of parallel fins upon the upper surface of said plate, said fins extending up and down the slope of said plate and defining a plurality of side-by-side channels for receiving drills of various sizes released for endwise downward movement out of said wedge-shaped opening, whereby drills placed in said hopper are automatically sorted into various ones of said channels in accordance with the diameters of the drills.

References Cited in the file of this patent

UNITED STATES PATENTS

| | | |
|---|---|---|
| 425,705 | Smallwood | Apr. 15, 1890 |
| 1,245,584 | Hallock | Nov. 6, 1917 |
| 1,617,663 | Avers | Feb. 15, 1927 |
| 2,091,815 | Hommel | Aug. 31, 1937 |
| 2,415,179 | Hurley | Feb. 4, 1947 |
| 2,446,320 | Andrews | Aug. 3, 1948 |
| 2,468,843 | Sunstein | May 3, 1949 |
| 2,617,526 | Lapointe | Nov. 11, 1952 |
| 2,642,974 | Ogle | June 23, 1953 |
| 2,794,551 | Colling et al. | June 4, 1957 |
| 2,821,301 | Montague | Jan. 28, 1958 |